United States Patent
Carmello et al.

(10) Patent No.: US 7,631,086 B2
(45) Date of Patent: Dec. 8, 2009

(54) VIRTUAL DEDICATED CONNECTION SYSTEM AND METHOD

(75) Inventors: Salvatore Carmello, Aurora, OH (US); Richard Vesel, Hudson, OH (US)

(73) Assignee: Onlex Technologies, Inc., Aurora, OH (US)

( * ) Notice: Subject to any disclaimer, the term of this patent is extended or adjusted under 35 U.S.C. 154(b) by 1183 days.

(21) Appl. No.: 10/955,224

(22) Filed: Sep. 30, 2004

(65) Prior Publication Data

US 2005/0120138 A1 Jun. 2, 2005

Related U.S. Application Data

(60) Provisional application No. 60/507,244, filed on Sep. 30, 2003.

(51) Int. Cl.
*G06F 13/00* (2006.01)
(52) U.S. Cl. .................. 709/227; 709/219; 709/225
(58) Field of Classification Search ................. 709/217, 709/219, 223, 225, 227, 228, 229
See application file for complete search history.

(56) References Cited

U.S. PATENT DOCUMENTS

| | | |
|---|---|---|
| 3,984,637 A | 10/1976 | Caudill et al. |
| 4,006,316 A | 2/1977 | Bolgiano |
| 4,051,326 A | 9/1977 | Badagnani et al. |
| 4,206,444 A | 6/1980 | Ferlan |
| 4,484,306 A | 11/1984 | Kulczyckuj et al. |
| 4,604,499 A | 8/1986 | Hughes |
| 4,647,721 A | 3/1987 | Busam et al. |
| 4,701,946 A | 10/1987 | Olivia et al. |
| 4,723,269 A | 2/1988 | Summerlin |
| 4,922,521 A | 5/1990 | Krikke et al. |
| 5,131,025 A | 7/1992 | Hamasaki |
| 5,198,806 A | 3/1993 | Lord |
| 5,243,644 A | 9/1993 | Garland et al. |
| 5,355,365 A | 10/1994 | Bhat et al. |
| 5,404,544 A | 4/1995 | Crayford |
| 5,410,713 A | 4/1995 | White et al. |
| 5,410,754 A | 4/1995 | Klotzbach et al. |

(Continued)

OTHER PUBLICATIONS

Newpoint, Phone Director Telephone-Activated Power Control, Newpoint Corporation Spec Sheet dated Aug. 1995 (2 sheets).

(Continued)

*Primary Examiner*—Viet Vu
(74) *Attorney, Agent, or Firm*—Jones Day (57) ABSTRACT

A system and method of enabling network-based communication between a requesting device and a disconnected remote device over a data network is provided. The method begins by transmitting a network address request message from the requesting device to an address resolution server. The network address request message is received at the address resolution server, and subsequently a validation message is transmitted to the disconnected remote device to determine if the disconnected remote device is disconnected from the data network. If no response is received to the validation message, then an activation signal is generated and transmitting to the disconnected remote device. In response to the activation signal, the remote device obtains a network address and connects to the data network. The obtained network address for the connected remote device is then provided to the requesting device to enable a network-based communication pathway from the requesting device to the connected remote device over the data network.

23 Claims, 6 Drawing Sheets

U.S. PATENT DOCUMENTS

| | | |
|---|---|---|
| 5,414,756 A | 5/1995 | Levine |
| 5,438,614 A | 8/1995 | Rozman |
| 5,586,257 A | 12/1996 | Perlman |
| 5,596,628 A | 1/1997 | Klein |
| 5,636,209 A | 6/1997 | Perlman |
| 5,726,984 A | 3/1998 | Kubler et al. |
| 5,764,639 A | 6/1998 | Staples et al. |
| 5,802,305 A | 9/1998 | McKaughan et al. |
| 5,805,587 A | 9/1998 | Norris et al. |
| 5,809,118 A | 9/1998 | Carmello et al. |
| 5,835,719 A | 11/1998 | Gibson et al. |
| 5,838,682 A | 11/1998 | Dekelbaum et al. |
| 5,870,540 A | 2/1999 | Wang et al. |
| 6,256,671 B1 * | 7/2001 | Strentzsch et al. .......... 709/227 |
| 6,425,000 B1 | 7/2002 | Carmello et al. |
| 6,961,561 B2 * | 11/2005 | Himmel et al. ............. 455/419 |
| 7,359,989 B2 * | 4/2008 | Orava et al. ................. 709/245 |

OTHER PUBLICATIONS

Newpoint, Operating Manual for Phone Director Telephone-Activated Power Control, Newpoint Corporation (5 sheets).

* cited by examiner

VIRTUAL DEDICATED CONNECTION SYSTEM AND METHOD

CROSS-REFERENCE TO RELATED APPLICATION

This application claims the benefit of U.S. Provisional Application Ser. No. 60/507,244 entitled "Virtual Dedicated Connection Process," filed on Sep. 30, 2003. The entire disclosure of this application is incorporated herein by reference.

BACKGROUND

1. Technical Field

This application generally relates to systems and methods for connecting electronic devices to a communication network.

2. Description of the Related Art

Various systems are known for connecting electronic devices to a communication network. Both narrowband and broadband technology solutions have become pervasive in the last few decades. Narrowband is a comparatively thin slice of bandwidth that is allocated to transmission of voice and data signals. Data communication speeds are usually limited by analog modem technology or the bandwidth available through typical wireless transmission protocols. Narrowband technologies include dial-back, direct-dial and product/user initiated dial-up telephone connections, typically using analog and/or digital modem technology. These technologies typically provide intermittent network connectivity—i.e., when a user initiates a dial-up connection—and also provide limited two-way access, are costly, and provide limited security. Dial-back technology can provide a higher level of security over direct dial network connections that only require a login and password, but security risks remain depending upon the type of equipment utilized. Moreover, dial-back technologies typically require special firewalls and dial-back passwords, which limits their utility.

Broadband technologies include DSL, T1 and Cable. Companies typically select broadband technologies for network device connectivity when they need dedicated, full-time connections for remote offices, users or devices. Broadband is not necessarily the best solution for all forms of remote access connectivity, however, because enterprises typically do not implement—or need—dedicated connections to all of their remote systems due to cost and availability of these broadband services.

SUMMARY

A system and method of enabling network-based communication between a requesting device and a disconnected remote device over a data network is provided. The method begins by transmitting a network address request message from the requesting device to an address resolution server. The network address request message is received at the address resolution server, and subsequently a validation message is transmitted to the disconnected remote device to determine if the disconnected remote device is disconnected from the data network. If no response is received to the validation message, then an activation signal is generated and transmitting to the disconnected remote device. In response to the activation signal, the remote device obtains a network address and connects to the data network. The obtained network address for the connected remote device is then provided to the requesting device to enable a network-based communication pathway from the requesting device to the connected remote device over the data network.

DETAILED DESCRIPTION

Figure 1A:
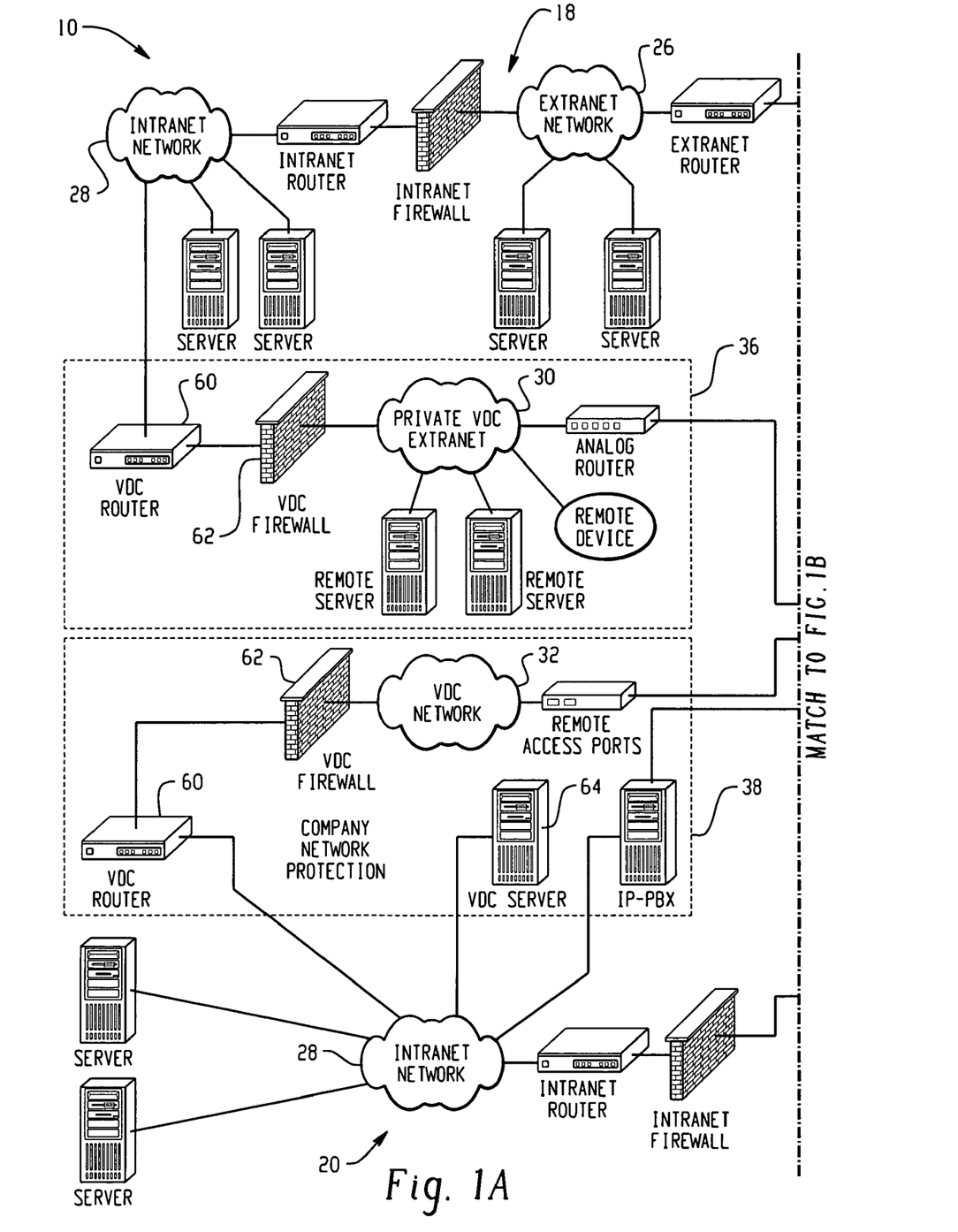
FIG. 1 is an exemplary system diagram showing a variety of interconnected virtual dedicated channel system implementations.
Figure 1B:
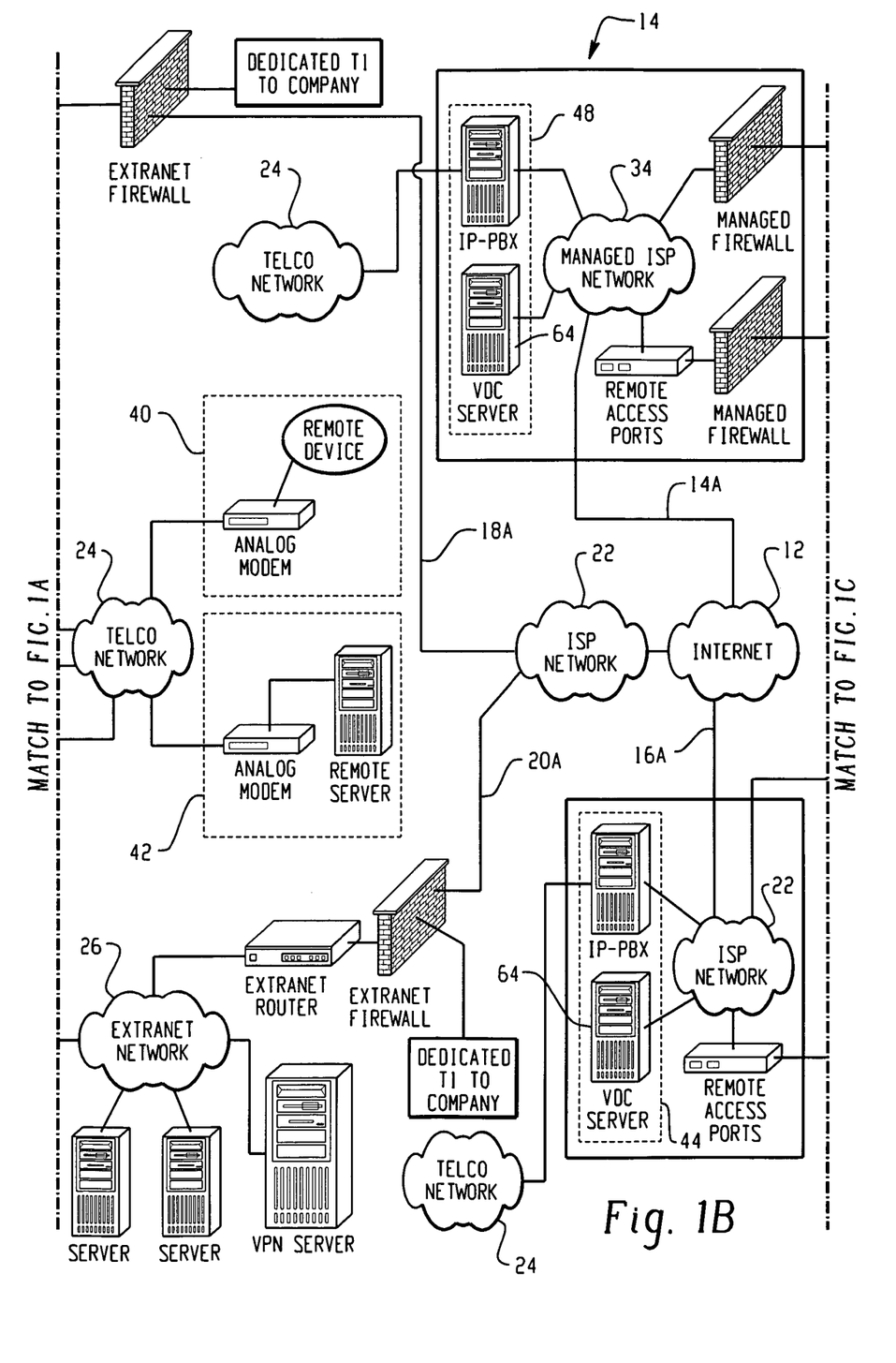
Figure 1C:
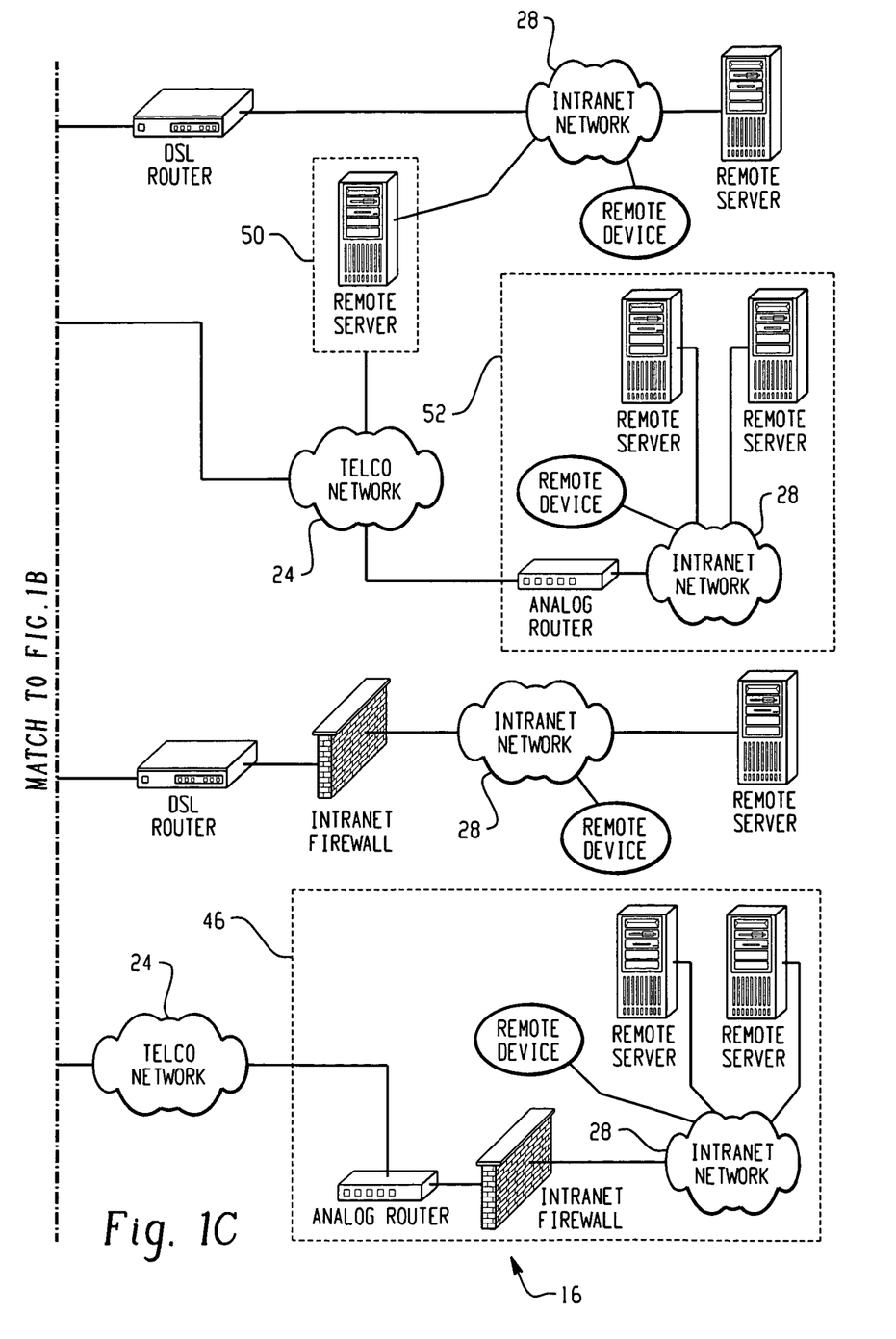

Turning now to the drawing figures, FIG. 1 is an exemplary system diagram 10 showing a variety of interconnected virtual dedicated channel (VDC) system implementations. This diagram 10 represents a complete VDC enabled two-way virtual private network (VPN). Typically, two-way VPN connections are limited to devices that are accessible only through a dedicated network. The VDC process, however, extends two-way access to dial-up modems and restricted VPN connections that do not necessarily include dedicated network connectivity.

An Example VDC System

The VDC system diagram 10 is divided into five segments that represent different types of VDC-enabled networks. The upper right 14 and lower right 16 segments represent VDC-enabled Internet Service Providers (public networks), each having customers with VDC-enabled sub-networks, devices, or systems.

The upper right 16 Internet Service Provider sub-system provides managed network services. This sub-system managed network 34 connects to the Internet 12 via high-speed connection 14A. The managed network 34 in turn connects to the VDC-enabled devices 48, including the IP-PBX and VDC Server 64 components. The IP-PBX is a digital, IP-based PBX server that connects the managed network 34 to an external telephone system 24. The managed network 34 is also coupled to two sub-nets through a pair of managed firewalls. One sub-net (the upper right sub-net), routes data through a DSL-router to an Intranet network 28 that may couple to one or more remote devices and/or remote servers, which may be subject to remote network activation according to the VDC process. The second sub-net (the lower right sub-net), routes data through a remote access port to a telephone network 24, which couples to either a remote server 50 or to an additional sub-network comprising an analog router, Intranet network 28 and one or more remote devices and/or remote servers that may be subject to remote network activation according to the VDC process.

The lower right Internet Service Provider sub-system 16 is identical in structure with the upper right sub-system 14, except that it does not provide a managed ISP network 34 including the managed firewalls. A VDC server component 64 is provided within the VDC-enabled equipment 44 for providing control over remote activation signaling for the one or more remote devices and/or remote servers 46 according to the VDC process.

In the center of the page is the Internet 12 (public network) segment. This network 12 connects to each of the four VDC-enabled segments 14, 16, 18, 20 via a corresponding high speed connection 14A, 16A, 18A, 20A.

The upper and lower left segments 18, 20 represent private corporate networks with dedicated Internet connections 18A, 20A. The lower left corporate network 20 is enabled with VDC server components 64, as well as other VDC components 38, whereas the upper left corporate network 18 only has VDC-enabled products 36.

High-speed connection 18A connects the upper left corporate network 18 to the Internet 12 via an ISP network 22. This connection 18A is routed through an Extranet firewall and an Extranet router to a corporate Extranet 26. The corporate Extranet 26 is, in turn, coupled to servers and also to a private corporate Intranet 28 through an Intranet firewall and a router. The private corporate Intranet is coupled to servers and also to the VDC-enabled components 36, including a VDC router, VDC firewall, a private VDC Extranet 30, and one or more remote devices and/or servers that may be remotely activated according to the VDC process.

Analogously, high-speed connection 20A connects the lower left corporate network 20 to the Internet 12, via an ISP network 22. This connection 20A is routed in the same manner as the connection 18A in the upper right network 18 to the VDC-enabled equipment 38. This equipment 38, however, includes a VDC server component 64, which can be used to manage the remote activation and signaling of remote devices and/or remote servers 40, 42, which are located remotely from the VDC-enabled equipment 38 via a telephone network connection 24. The VDC-enabled equipment 38 of the lower left network also includes a VDC router 60, a VDC firewall 62, and a VDC network 32. The lower left network also includes a VPN server for controlling and managing virtual private network connections throughout this part of the network. Also shown in FIG. 1 are a pair of dedicated T1 connections to the two corporate sub-nets.

Within each segment, 14, 16, 18, 20, the dotted-line boxes 36, 38, 40, 42, 44, 46, 48, 50, and 52 contain VDC-enabled networking equipment and/or equipment dedicated to the VDC process. The "IP-PBX" and "VDC Server" 64 are dedicated VDC components. The "VDC Router" 60 and "VDC Firewall," 62 may be standard networking equipment used to create the "VDC Network" 32, or sub-net. The "Private VDC Extranet" 30 is an isolated sub-net, inside a private network, provided to vendors to support equipment.

The VDC Process

The virtual dedicated connection (VDC) process makes a disconnected TCP/IP network, device, or system (or other type of disconnected network) appear as if it were connected on a dedicated network connection. This process is enabled by modification to the typical domain name server (DNS) functionality of the network. The domain name server is the primary service responsible for the translation of a logical device name into a Internet Protocol (IP) Address. This service also includes the DHCP service. In the VDC process, the Internet Protocol (IP) Address is used to track the remote activation of each device and/or server subject to activation.

The Domain Name Server (DNS) system is organized into a hierarchical tree structure allowing each organization to maintain and customize their particular element of the tree. Because of this tree structure, the entire Internet, and protected Intranets, are accessed with the use of a single logical naming scheme. Each device in the network is assigned a unique name and a static or dynamic Internet Protocol Address.

The VDC process may be integrated into the DNS service through a group of software applications. It makes no changes to the domain name server's application program interface (API), which is used by every application to resolve names and addresses. The benefit of this structure is the transparent integration into any public or private network. Because the domain name server (DNS) is so ingrained in the fundamental network infrastructure, virtually every application used on TCP networks makes calls to this service to find other devices. Thus, the VDC process extends this fundamental service to also provide for remote activation of devices and/or servers that are not on dedicated channels.

When the VDC-enabled domain name server receives an address resolution request, it determines the current device connection status. If the device is not currently attached to the network, then it is sent an activation signal from the server. The disconnected device will then connect to the network. At some logical conclusion to the connection process, the VDC domain name server will return a resolution response to the requesting network application. The network application that made the address resolution request has no knowledge that the requested device was not connected to the TCP network when the request was made—thus providing the appearance of dedicated network connectivity for any type of remote device and/or server.

An example connection process is now described between a corporate office and some remote device and/or server:

Step 1—A person or process requests access to a remote establishment. When the remote establishment has a dedicated connection, the requester is quickly routed to the establishment.

Step 2—(Assuming dialup access/VPN—i.e., no dedicated connection)—The remote device and/or server is currently disconnected. The VDC process transparently detects a request to access the remote device and/or server.

Step 3—An activation signal is transmitted to the remote device and/or server. The remote device and/or server receives the activation signal and establishes a network connection to a network service provider or their corporate IT department.

Step 4—Once connected, the remote device and/or server initiates a VPN connection to their corporate IT department.

Step 5—The VDC server exchanges connection protocol messages with the remote device and/or server.

Step 6—Once completed, the person or process requesting access is routed to the remote device and/or server.

Step 7—At this point the requestor communicates with the requested device and/or server.

The VDC process may operate over any communications system or data network. The process acts like an analog router, which manages packets of data to and from narrow-band connections in a connected or disconnected state. This analog router is shown in FIG. 1 as the VDC Router 60.

With the VDC process implemented, enterprises and service providers gain two-way network access for all devices or systems anywhere in the world, through public or private networks at any time of day. Currently, two-way VPN connections are established to devices that are accessible only through a dedicated network. The VDC process, however, extends two-way access to dial-up modems and restricted VPN connections, and or other devices and/or servers capable of responding to the VDC process remote activation signals. Exemplary devices that are capable of so responding are described in co-owned U.S. Pat. Nos. 5,809,118 and 6,425,000, both of which are hereby incorporated into the present application by reference.

Figure 2A:
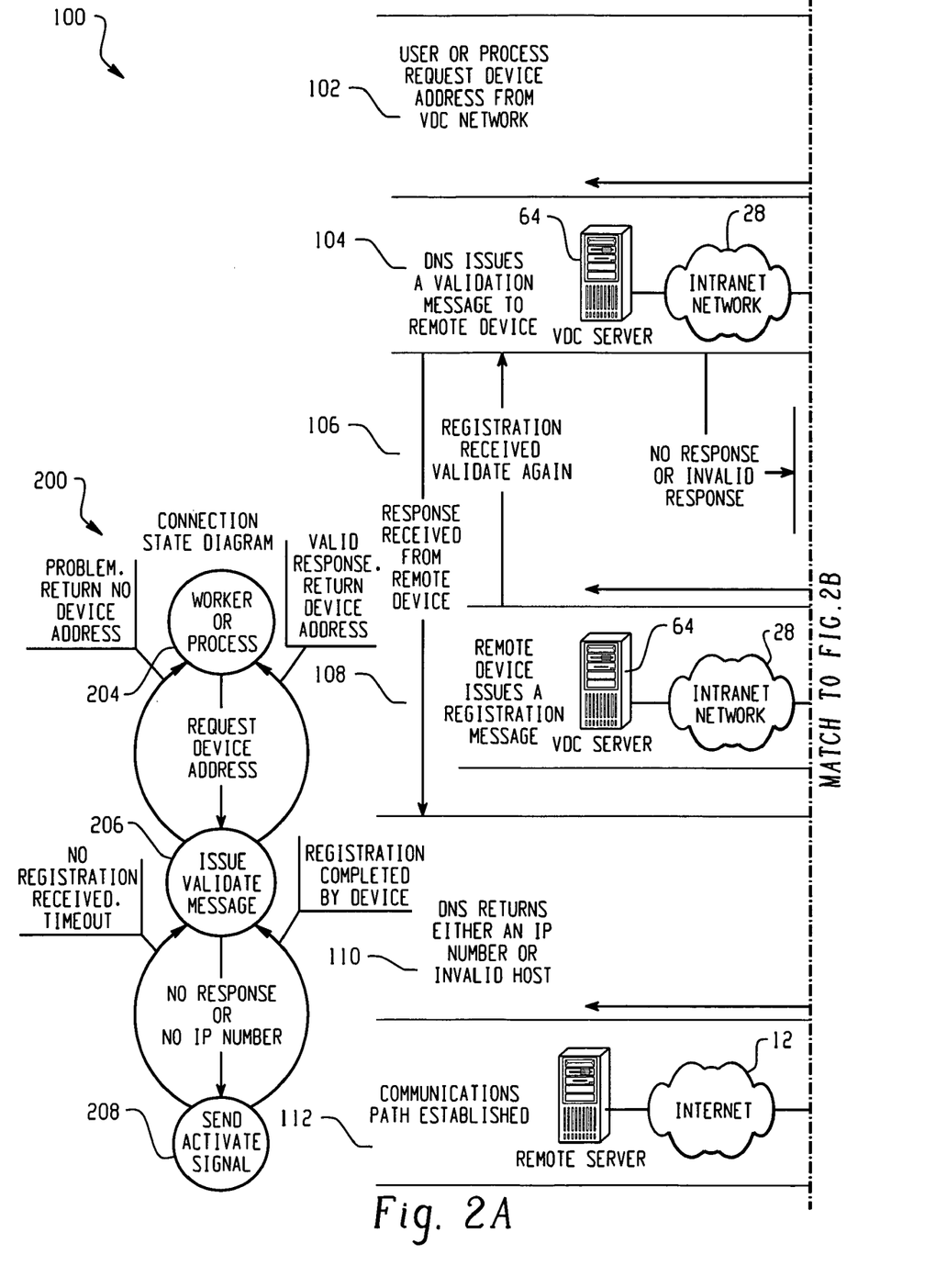
FIG. 2 is a combined process flow diagram and connection state diagram corresponding to the exemplary system diagram of FIG. 1.
Figure 2B:
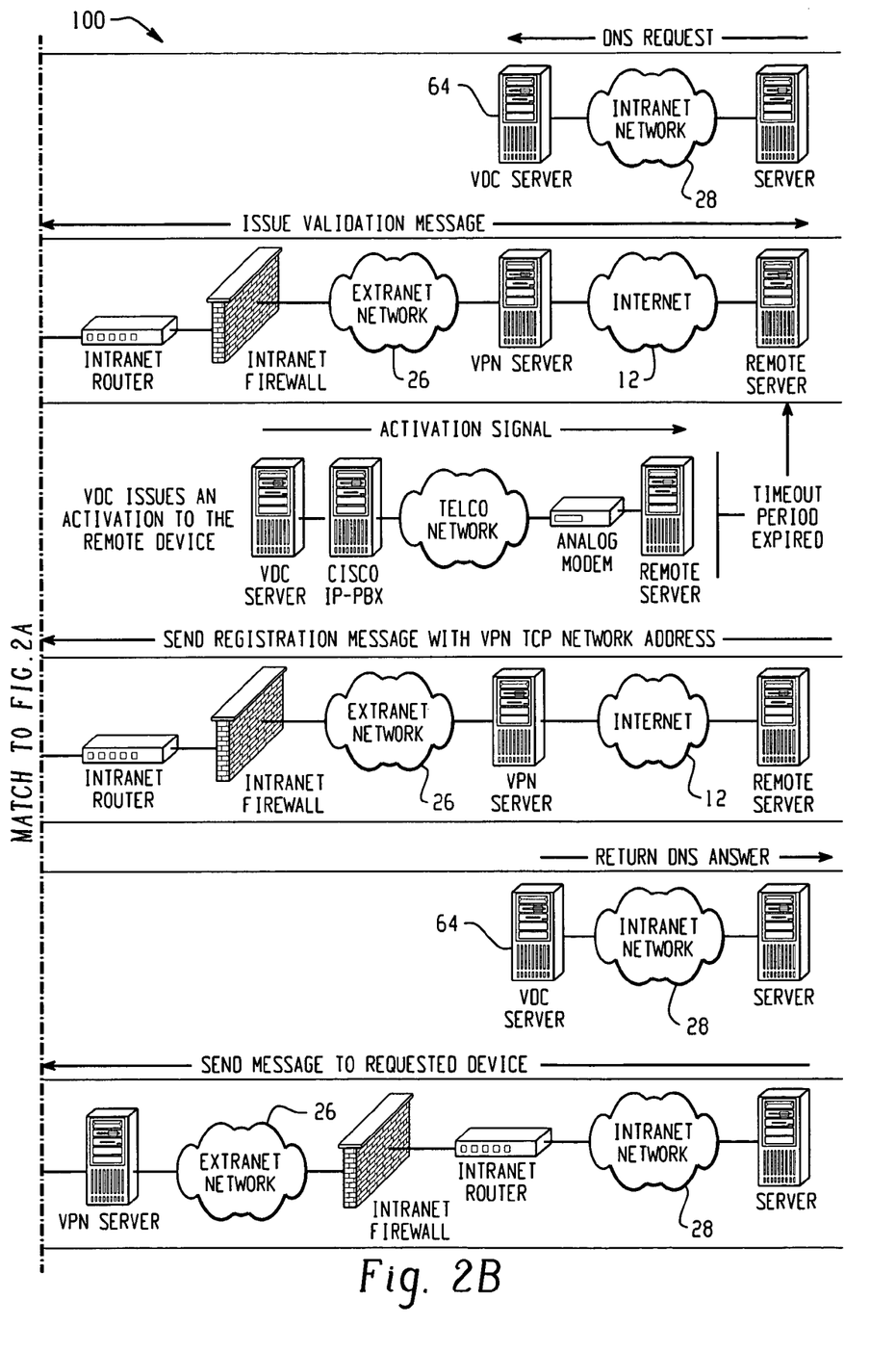

FIG. 2 is a combined process flow diagram 100 and connection state diagram 200 corresponding to the exemplary system diagram of FIG. 1. This figures provides a more detailed explanation of one exemplary process for making a virtual connection to a remote device and/or server according to the VDC process.

As described above, the Virtual Dedicated Connection (VDC) Process, in its simplest form, is a virtual connection to a device or system that is typically in a non-connected mode. A physical connection is established when the non-connected device or system needs to receive a data packet. At this point, a dedicated or two-way connection is established by the process.

The process flow diagram 100 of FIG. 2 begins at step 102, where a user or process requests a device address from the VDC network. This is depicted as a DNS request message from the server on the right-hand side of the figure to the VDC server 64 via an Intranet network 28. In reaction to this DNS request message, in step 104, the VDC-enhanced DNS service issues a validation message to the remote device (remote server) to determine whether or not the requested device is connected to the network. If a response is received from the remote server, thereby indicating that it is connected to the network, then steps 106 and 108 of the process are skipped. If, however, no response is received to the validation message in step 104, or the response is not a valid response, then in step 106 the VDC server issues an activation signal to the remote device in order to cause it to connect to the network. If the remote device does not respond, or is incapable of responding to the activation signal within a particular timeout period, then control reverts to step 104 and the process is repeated until the remote device responds. If the remote device is capable of responding, however, then in step 108 it issues a registration message including the VPN TCP network address of the remote device. Control then passes to step 110 (which is also the step executed if a response was received from the remote device in step 104) in which the VDC server 64 returns either an IP address or an invalid host response to the requesting user or process. The requesting user or process then establishes the communication path to the remotely-activated device and/or server in step 112.

The connection state diagram 200 mirrors this process. State 204 describes a worker and/or process state. When the worker and/or process desires to access a particular remote device and/or service it issues a device address request. This transitions the process to the issue validation message state 206. In this state 206, a determination is made as to whether the requested device is activated and connected. If so, then a valid response signal is generated and the state transitions to the initial state 204. If not, however, then a "no response" or "no IP" number determination is made and the process transitions to the send activate signal state 208. In this state, the process attempts to register the disconnected device and complete the network connection. If the registration/connection is successful, then a registration completed signal causes the process to transition back to state 206, and if a valid response is received from the newly registered device, then the process transitions back to the initial state 204. If, however, the registration/connection fails, then control transitions back to step 206, in which one or more additional attempts may be made to register the device. If the device continues to fail to register and connect, then a problem signal returns the process to the initial state 204.

Having described the details of the exemplary process of FIG. 2, it is instructive to consider a real-world example that tracks this process. In this example, the owner of an automated teller machine (remote device) needs to occasionally access the ATM to provide for administrative support. Because access is intermittent, perhaps only once per day or once per week, it is not efficient or useful to have a dedicated link to the ATM. Using the VDC process and system, the ATM can be provided with a non-dedicated communication channel, but still retain the appearance of a dedicated channel. The process proceeds as follows:

(1) The owner of the ATM needs to access the remote unit to perform preventive analysis and update the ATM problem detection algorithm. A service engineer has been assigned to perform this task.

(2) The engineer opens a telnet session from his terminal and requests a connection to the logical domain name "atm.remote.vdc.company.com". The telnet program requests an Internet Protocol Address from the VDC-enabled domain name server.

(3) The VDC-enabled domain name server identifies this name as a VDC-enabled device. Based on this determination, the request is transmitted to the VDC controller process. The domain name server waits for a response.

(4) The VDC controller process looks up the logical domain name of the ATM. If the ATM is supported and an Internet Protocol Address is available, then an identification (or validation) request is transmitted to the remote ATM. The ATM then responds back to the VDC Controller with its logical domain name and Internet Protocol Address.

(5) If the VDC controller process received no reply or an incorrect reply from the identification request, then the VDC controller will issue an activation signal to the remote ATM. The remote ATM receives the activation signal and initiates a connection to the support servers department of the ATM Company. Upon connecting, the ATM issues a registration message to the VDC controller process. Another identification request is transmitted after the registration message.

(6) The VDC-enabled domain name server program receives a reply from the VDC controller process. The domain name server returns the Internet Protocol Address to the telnet session that establishes an open communications session. The engineer now has access to the ATM to perform the required tasks.

Figure 3:
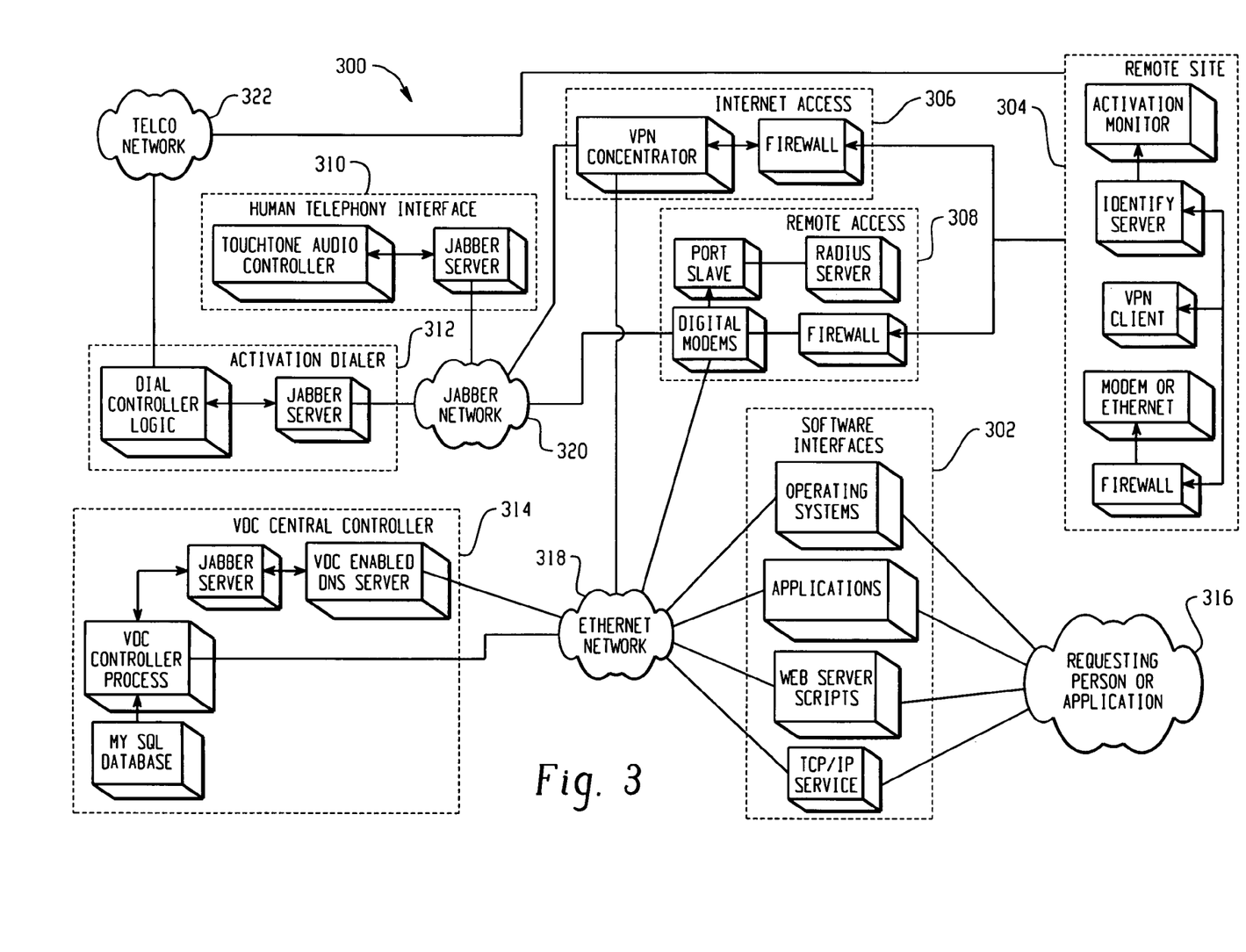
FIG. 3 is an exemplary hardware/software implementation diagram of a virtual dedicated channel system.

FIG. 3 is an exemplary hardware/software implementation diagram 300 of a virtual dedicated channel (VDC) system. The system includes software interfaces 302, one or more remote activation sites 304, internet access 306, remote access components 308, a human telephony interface 310, an activation dialer 312, and a VDC central controller 314. Connecting these components are an Ethernet network 318, a Jabber network 320 and a telephone company network 322. Also shown in FIG. 3 is the requesting person and/or application 316.

The Ethernet network 318 is used for an establishment's internal network or Intranet. In an enterprise, Ethernet provides communications between components of the VDC process, DNS servers and all other networked computers. It also acts as the transport mechanism for VPN communications and Jabber IRC messages.

The Jabber network 320 is a network of Jabber servers and client software that understand the Jabber IRC application program interface. This network provides for all inter-process communications between modules.

The telephone network 322 handles activation calls, provides analog connections for modems and digital communications for ISDN connections. It is used to receive activation directions from individuals or applications using a telephony solution.

The activation dialer 312 platform manages the process of dialing phone numbers through the "Telco Network" 322. It will receive a request, dial a number based on specified parameters and return a status to the requester. This platform 312 includes dial controller logic and a Jabber server. It is also connected to the Jabber network 320.

The dial controller logic is an application and a driver. It provides an application program interface for other software components to communicate with it. Internal logic is provided in this component to enable dialing of a phone number and termination of the call after a specified number of rings. The status of the call may also be detected. Possible status values include wrong numbers, connections completed and busy signals. This status may be transmitted back to the calling module. In addition, this component may maintain statistics for each number processed. An example of the activation dialer is an IP-PBX system. The Jabber server is an IRQ messaging system server. Client programs connect to the server and send XML requests to other components in the system design.

The software interfaces 302 provide the Domain Name Servers' name resolution protocol. Examples of software interfaces include customer relationship management systems, databases, standard operating system tools and Internet access protocols. These applications run on standard PCs, servers and mainframe computers. The operating systems components are capable of generating connection requests. Almost every network service requires a logical domain name for each device or system it is communicating with. Some examples are NFS, xinetd and a normal DNS process. The TCP/IP service creates an accessible system port for other programs to access. These programs will convert the incoming protocols into a domain name server request, and the TCP/IP service will maintain the open connection and convert the answer back into the original protocol. The web server scripts are PHP, ASP or CGI scripts that provide a conversion from HTML protocol to XML. They also understand the application program interface required to talk to the VDC controller.

The human telephony interface 310 includes a touch tone audio controller and a Jabber server, and is designed to receive telephone calls from people or applications. It processes touch tone signals or human voice to determine the status of supported devices. It also may initiate and report status of required actions. Examples of this component include an IP-PBX system or a Quicknet Phone Jack PCI card with Asterisk PBX software. The touch tone audio controller provides an audio and touch tone interface over standard phone lines. It receives a user identification, system identification, passwords and requested actions, and, in response thereto, will execute those actions and report back the status of each action across multiple sessions.

The Internet access components 306 include a VPN concentrator and a firewall. These components provide the company's primary Internet access mechanism. The VPN concentrator receives incoming VPN connect requests. This is performed independent of the type of remote Internet connection being established.

The remote access components 308 provide a private remote access solution, including a high density and low maintenance way to permit remote devices or systems to access required support sites. These components may include digital modems, a port slave, a radius server and a firewall. An example of this component is a Cyclades PC400 PCI card with high density embedded digital modems. The digital modems are modems capable of processing analog signals from high-density trunk lines. They provide high quality and dependable access ports in a small amount of space, and convert the signal into a digital form to allow the host system to process the data for network access. The Cyclades PC400 PCI card supports two T-1 connections having 48 independent communications channels. Each host system can use up to four of these PCI cards. The port slave component manages multiple incoming connection channels in a remote access solution. It has been highly optimized and designed to work with Radius servers. The Radius server is a component that has a database of authorized users and functions to control access and assignment of communication parameters.

The remote site components 304 include an activation monitor, identify server, VPN client, modem or Ethernet connection and a firewall. These elements may be integrated into a standard computer, an embedded device or an external interface for older devices. The VPN client and firewall are optional components. The activation monitor is a small program located on the remote device or system. Its job is to detect an incoming activation signal and then to cause the device to connect to a particular designated access point. The identify server is a small module located on the remote device that waits for a request from the VDC controller before responding with the remote device's name and Internet protocol number assigned to the network interface card. The VPN client is standard software used by the remote device to make a VPN connection through the Internet. This connection is independent of the method by which the device or system is connected to the Internet.

The VDC central controller 314 provides the enabling functionality of the VDC process, and may include a VDC-enabled DNS server, a Jabber server, a VDC controller process, and a My SQL database component. The VDC central controller 314 may be a standard high performance computer running the primary VDC control logic and VDC-enabled domain name servers. It acts as an ancillary domain name server or replaces the company's primary domain name server. An example of such a controller is a Dell 1650 1U dual processor rack mount computer. The My SQL database component provides persistent memory storage for the VDC controller, the stored data being associated with each of the remote devices or systems capable of network activation.

The VDC controller process provides the primary control logic for each VDC-enabled remote device. The current state and Internet protocol address of every remote device is retrieved upon request. If the Internet protocol address is not correct, an activation signal is transmitted to the remote device or system. A message will then be returned to the requestor with a valid response or an error message.

The VDC-enabled DNS server may be any standard DNS program, written in any language, modified to work with the VDC process. Modifications are made at the location where the DNS process accesses its internal database. At this point, a message is sent to the VDC controller process when the logical domain name or Internet protocol address matches a preset value. The normal reply generation continues when a response is received from the VDC controller process.

Example Implementations

This section of the application builds upon the exemplary systems and methods discussed with reference to FIGS. 1-3 by providing several possible implementations of the virtual dedicated channel technology.

1. VDC Narrowband Implementation

The retail sale or service industries provides a good fit for VDC narrowband implementations. Retail establishments have minimal bandwidth and infrequent access requirements. Their typical employee has no need to access an external network, and thus generally do not require dedicated links. A good example of this would be a single chain restaurant, like McDonalds, with 5000 locations in the United States. The corporate Information Systems department needs to support each establishment with network communications for the transfer of operational and management data, which is intermittently required. The restaurant chain could save millions of dollars a year and simplify network management by implementing VDC narrowband technology in their network in place of more expensive dedicated links.

2. Device Relationship Management (DRM) Implementation

The DRM market applies to businesses that make products with embedded microprocessors or maintain a distributed network of remote consumer or business self-service devices. One example of this could be a distributed ATM network of cash machines owned by a bank. Increasing employee productivity and reducing costs is what businesses strive for when implementing Device Relationship Management (DRM). Adding the VDC Process to DRM systems provides significant cost reduction by enabling enterprises to gain access to devices or systems not on dedicated connections and not accessible through a two-way VPN connection.

The VDC technology can integrate with any customer or service support system. These improved service support systems will be able to perform active preventive maintenance programs, automated surveys, interactive access and automated full life cycle maintenance for all supported products.

Other Examples of VDC enabled products in this segment may include vending machines, self-storage kiosks, turnkey software application (including hardware), retail check-out systems, technical diagnostics machines, CNC machining centers, medical monitoring systems, any machines used in manufacturing processes, as well as many others.

3. Redundant Channel Implementation

Anywhere a narrowband connection exists, an establishment could add a backup connection utilizing the VDC system and method. A redundant VDC system could also be integrated with dedicated connection routers to create redundant channels. A redundant channel is not used under normal operating conditions and does have some limitations. When the primary broadband data connection is impaired, the network could be designed to automatically switch to the VDC-enabled redundant channel.

Consider the following example. A service provider is managing an establishment's external data connection with no backup connection. If the data connection is impaired, both the service provider and the establishment will incur additional communication costs and productivity losses. By adding a VDC-enabled system, however, the establishment's external data connection would be immediately switched over to a narrowband redundant connection. Productivity losses would thereby decrease and connection downtime would be reduced substantially. Once the problem is fixed, the connection would automatically be switched back to the primary network path.

4. Black Network Process Implementation

A simple description of this implementation begins with a system, network, or device in a disconnected state. By disconnected state it is meant that the device is not logically connected to a communication network such that it can be communicated with, although it may be physically connected thereto. For example, a device may have a network interface card (NIC) that is physically connected to the communication network but is in a disconnected state because the NIC card is powered down or otherwise disabled. In this state, the virtual private network client is not active, the network interface is powered down and there is no Internet protocol address assigned to the device. The Black Network becomes active when the VDC-enabled component receives an activation signal. Because of this signal, the VDC software initiates a process that causes the network interface to power up and the host operating system requests a random Internet protocol address. At this point, the system, network or device connects to the network and the virtual private network client software connects to the corporate network. Now, the system, network or device is in a connected state.

The Black Network implementation of the VDC technology is a new security process for systems, networks or devices that have dedicated network access. Once an establishment implements a Black Network, a system, network or device normally remains disconnected from its network, becoming invisible and inaccessible. The system, network or device only becomes visible when access is required.

An analogy to the Black Network implementation is a military radio performing burst transmissions to communicate. The communication process is completed quickly and securely, keeping the endpoint locations unknown. The same is true with Black Network activation. A Black Network VDC implementation provides establishments with added levels of security for critical systems, networks or devices. These components cannot be attacked when they cannot be found.

The following provides an example of such a Black Network implementation of the VDC technology. An enterprise may have a network of remote kiosks in various retail locations throughout North America. The kiosks are connected by dedicated and non-dedicated connections with virtual private networks between the kiosks and the corporate network. Virtual private networks and firewalls provide reasonable security protection for dedicated connections over public networks. However, even these protective measures are not completely secure.

An additional layer of security is achieved when an enterprise implements a Black Network. With a Black Network, the enterprise activates a virtual private network session over a broadband or narrowband connection and limits the amount of time the network connection is visible to public networks. In this process, data is quickly transmitted over the virtual private network. The connection is terminated when it is no longer needed and the kiosk disables its network interface. The kiosk then waits for another access request.

5. Corporate Implementation

A more specialized implementation of the Black Networks concept is detailed below with reference to a private companies internal security. Many corporations limit access to special segments of office space, computer rooms, computers and specialized equipment. These special access points permit additional layers of physical security. Typically, all employees are entrusted with access to the building where such restricted access may be provided, but not all employees are entrusted with access too all areas within the building. Only a small subset of employees are allowed entrance to specific limited access areas. In addition, many computers or specialized equipment are protected with special access restrictions. Both communications and network hardware link these special areas with the rest of the corporation. At a minimum, most corporations use internal firewalls routers to protect these special networks.

By replacing the internal firewall routers with a VDC-enabled firewall router, an additional layer of security can be achieved. The VDC router would make it more difficult for trusted employees, visitors, or hackers that have already penetrated the primary corporate firewall to attempt to penetrate special protected areas. This is made possible because the VDC-enabled firewall router hides itself from the rest of the network until it is needed. When needed, the VDC router may select a random Internet protocol address and begin providing network services and then disconnect when it is done. By limiting its network visibility to the brief period of time in which it is needed for communications, the secure portion of the internal network becomes less susceptible to intrusion.

The above-described embodiments of the invention are intended to be examples only. Those of skill in the art may effect alterations, modifications and variations to the particular embodiments without departing from the scope of the invention.

We claim:

1. A method of enabling network-based communication between a requesting device and a disconnected remote device over a data network, comprising:
   transmitting a network address request message from the requesting device to an address resolution server, the network address request message requesting a network address for the disconnected remote device;
   receiving the network address request message at the address resolution server and transmitting a validation message to the disconnected remote device to determine if the disconnected remote device is disconnected from the data network;
   if no response is received to the validation message, then generating an activation signal and transmitting the activation signal to the disconnected remote device;
   receiving the activation signal at the remote device, and in response thereto, the remote device obtaining a network address and connecting to the data network;
   transmitting the obtained network address for the connected remote device to the address resolution server; and
   providing the obtained network address to the requesting device to thereby enable a network-based communication pathway from the requesting device to the connected remote device over the data network.

2. The method of claim 1, further comprising:
   after transmitting the activation signal to the disconnected remote device, waiting for a predetermined period of time;
   after the predetermined period of time has expired, re-transmitting the activation signal to the disconnected remote device.

3. The method of claim 1, further comprising:
   determining whether the obtained network address received at the address resolution server is valid; and
   if the obtained network address is not valid, then transmitting a notification signal to the requesting device indicating that the address request message is associated with an invalid system.

4. The method of claim 1, wherein the address resolution server is a DNS server.

5. The method of claim 1, wherein the activation signal is transmitted to the disconnected remote device over a telephony network.

6. The method of claim 1, wherein the activation signal is transmitted to the disconnected remote device over a packet data network.

7. The method of claim 1, wherein the data network is the Internet.

8. The method of claim 1, wherein the disconnected remote device is selected from the group consisting of an automated teller machine, a retail checkout computer system, a machine used in a manufacturing process, or a medical monitoring system.

9. A method of enabling network-based communication between a requesting device and a remote device over a data network, comprising:
   transmitting an address request message from the requesting device to a network server, the address request message requesting a network address for the remote device;
   receiving the address request message at the network server and transmitting a validation message to the remote device to determine if the remote device is in a disconnected state in which it is logically disconnected from the data network;
   if no response is received to the validation message, then generating an activation signal and transmitting the activation signal to the remote device;
   receiving the activation signal at the remote device, and in response thereto, the remote device obtaining a network address and communicating with the data network in order to logically connect to the data network;
   transmitting the obtained network address for the remote device to the network server; and
   providing the obtained network address to the requesting device to thereby enable a network-based communication pathway from the requesting device to the connected remote device over the data network.

10. The method of claim 9, further comprising:
    after transmitting the activation signal to the logically disconnected remote device, waiting for a predetermined period of time; and
    after the predetermined period of time has expired, re-transmitting the activation signal to the logically disconnected remote device.

11. The method of claim 9, further comprising:
    determining whether the network address is valid; and
    if the network address is not valid, then transmitting a notification signal to the requesting device indicating that the address request message is associated within an invalid system.

12. The method of claim 9, wherein the activation signal is transmitted to the logically disconnected remote device over a telephony network.

13. The method of claim 9, wherein the activation signal is transmitted to the logically disconnected remote device over a packet data network.

14. The method of claim 9, wherein the remote device is selected from the group consisting of an automated teller machine, a retail checkout computer system, a machine used in a manufacturing process, or a medical monitoring system.

15. The method of claim 9, wherein the remote device is physically connected to the network when in the disconnected state.

16. The method of claim 15, wherein the remote device is physically connected to the network through a network-interface card.

17. The method of claim 16, wherein the remote device is not associated with an IP address when in the disconnected state.

18. The method of claim 17, further comprising:
    obtaining an IP address at the remote device in response to the activation signal.

19. The method of claim 18, further comprising:
    causing the operating system of the remote device to request a random IP address from the network.

20. The method of claim 9, wherein the remote device includes a virtual private network client that is not active when the remote device is in the disconnected state.

21. The method of claim 20, further comprising:
    activating the virtual private network client in response to the activation signal; and
    the virtual private network client connecting to a network using the network address.

22. The method of claim 9, wherein network hardware of the remote device is connected to the network but an operating system of the remote device is not logically connected to the network.

23. A method of enabling network-based communication between a requesting device and a remote device over a virtual private data network, comprising:

transmitting an address request message from the requesting device to a network server, the address request message requesting a network address for the remote device;

receiving the address request message at the network server and transmitting a validation message to the remote device to determine if the remote device is in a disconnected state in which it is logically disconnected from the virtual private data network;

if no response is received to the validation message, then generating an activation signal and transmitting the activation signal to the remote device;

receiving the activation signal at the remote device, and in response thereto, the remote device obtaining a network address and communicating with the virtual private data network in order to logically connect to the virtual private data network;

transmitting the obtained network address for the remote device to the network server; and     providing the obtained network address to the requesting device to thereby enable a network-based communication pathway from the requesting device to the connected remote device over the virtual private data network.

\* \* \* \* \*